A. J. BENSON.
NUT LOCK.
APPLICATION FILED SEPT. 13, 1920.
1,387,096. Patented Aug. 9, 1921.
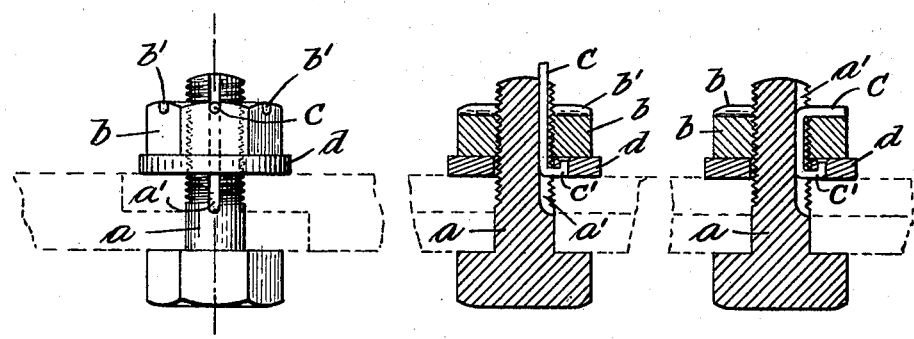
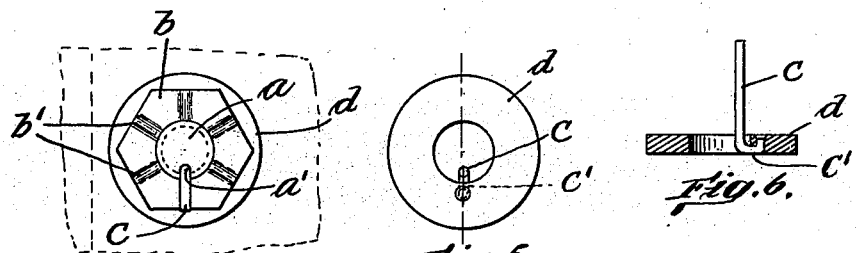
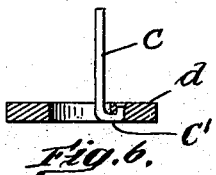

UNITED STATES PATENT OFFICE.

ARTHUR J. BENSON, OF MALDEN, MASSACHUSETTS.

NUT-LOCK.

1,387,096.          Specification of Letters Patent.          Patented Aug. 9, 1921.

Application filed September 13, 1920. Serial No. 409,824.

*To all whom it may concern:*

Be it known that I, ARTHUR J. BENSON, a citizen of the United States, and a resident of Malden, county of Middlesex, State of Massachusetts, have invented an Improvement in Nut-Locks, of which the following is a specification.

This invention relates to that class of nut locks in which a positive lock is provided between the nut and the bolt, as distinguished from that class which rely on frictional engagement to hold the nut in place, and more particularly, to that class in which a tongue, which is positively engaged with the bolt, is adapted to be brought into engagement with a nut having a plurality of tongue-receiving notches in its upper side.

The object of my invention is to provide a form of nut lock, of the above described character, which will not interfere with the operation of screwing the nut onto the bolt and is of such a construction that it may be manufactured at less expense than similar devices of the same general type.

I accomplish this object by means of the construction shown in the accompanying drawings in which:

Figure 1 is a side elevation and

Figs. 2 and 3 are central longitudinal sectional views of an embodiment of my invention.

Fig. 4 is an end view thereof.

Figs. 5 and 6 are detail views of a form of combined washer and locking tongue, which I employ.

According to my invention the bolt $a$, having a nut $b$ threaded thereon, is provided with a longitudinal slot $a'$ throughout the length of the threaded portion thereof, the depth and width of said slot being sufficient to receive, somewhat loosely, a tongue $c$, so that it may be located below the bottom of the screw threads, in a position in which it will not be engaged by the nut when it is screwed on to the bolt. The tongue $c$ may be simply a short length of round iron wire which is adapted to be bent without breaking. A washer $d$ is provided, to which the tongue $c$ is attached, at one end, in any suitable manner. In the method of attachment shown in Figs. 1 to 6, a hole is bored through the washer, adjacent the washer hole, and the tongue is bent at right angles at two points, so that its end portion $c'$ may be hooked into the hole, which has been formed in the washer. To prevent detachment of the tongue from the washer, the end of the inserted portion may be slightly headed down, as indicated in Fig. 6. Also, if it is desired to have the washer bear on a flat surface, so that the transversely bent portion of the tongue will not hold the washer out of contact therewith, a recess may be cut in the washer from the middle hole to the small hole in which the tongue is inserted, to receive said transversely bent portion, as shown in Fig. 6.

In placing the washer on the bolt, the washer is moved to such a position that the tongue enters the slot of the bolt, and slides therein, as the washer is moved down to the position in which it engages the surface against which it is to be clamped.

The top side of the nut is provided with a series of radially disposed tongue-receiving slots, $b'$ the particular number thereof being immaterial, so that, when the parts are in the position of Fig. 2, and the nut has been screwed up as far as desired, the end portion of the tongue, which extends beyond the nut, may be bent into one of these slots, as shown in Fig. 3, in which position the tongue will hold the nut from unscrewing, as it is held by the sides of the slot in the bolt from transverse movement; and, when the nut is screwed onto the bolt, it will hold the tongue from longitudinal movement by reason of the transversely bent ends of the latter.

By having the tongue connected to the washer, the tongue is always held in position for engagement with the nut, and the length of the tongue only needs to be sufficient to extend through the nut and to provide sufficient length for engagement in one of the slots $b'$, as the tongue is slid to the desired position when the washer is placed on the bolt.

I claim:

A screw-threaded bolt having a longitudinal slot in its threaded portion, a nut and a washer on the bolt, said washer having an aperture therethrough between its outer and inner peripheries and having a recess in its inner side leading from said aperture to the washer opening, and a tongue disposed in said slot and longitudinally movable therein beneath the bottom of the screw threads, the inner end-portion of said tongue being extended transversely into said washer recess and through said aperture and having a headed end, to lock the same to the washer and the outer end portion of the tongue being adapted to be bent into engagement with the nut, to hold the same from turning.

In testimony whereof, I have signed my name to this specification.

ARTHUR J. BENSON.